United States Patent [19]

Suzuki et al.

[11] Patent Number: 4,929,093

[45] Date of Patent: May 29, 1990

[54] FIRE DETECTOR HAVING A PROTECTIVE COVER

[75] Inventors: Takashi Suzuki; Hideto Amemiya, both of Tokyo, Japan

[73] Assignee: Nittan Company

[21] Appl. No.: 299,449

[22] Filed: Jan. 23, 1989

[30] Foreign Application Priority Data

Feb. 2, 1988 [JP] Japan .................................. 63-12163

[51] Int. Cl.[5] ........................ G08B 17/00; G01K 7/18; G01K 7/22; G01K 1/08

[52] U.S. Cl. .................................... 374/208; 374/210; 374/185; 374/158; 374/209; 340/584; 340/693

[58] Field of Search ............... 374/158, 208, 209, 185, 374/210; 340/584, 595, 693

[56] References Cited

U.S. PATENT DOCUMENTS

| | | | |
|---|---|---|---|
| 2,469,501 | 5/1949 | Gogniat | 340/693 |
| 3,522,595 | 3/1973 | White | 340/593 |
| 3,827,039 | 7/1974 | Agnese | 340/586 |
| 4,049,984 | 9/1977 | Ishii et al. | 310/42 |
| 4,127,839 | 11/1978 | Ito et al. | 337/408 |
| 4,227,085 | 10/1980 | Sunde | 250/384 |
| 4,238,788 | 12/1980 | Rosauer et al. | 340/629 |
| 4,310,837 | 1/1982 | Kornrumpf et al. | 340/598 |
| 4,383,253 | 5/1983 | Lam et al. | 340/629 |
| 4,388,617 | 6/1983 | Nakanishi et al. | 340/693 |
| 4,428,909 | 1/1984 | Yashiki et al. | 73/27 R |
| 4,529,976 | 7/1985 | Jameson et al. | 340/693 |
| 4,651,140 | 3/1987 | Duggan | 340/693 |
| 4,694,285 | 9/1987 | Scripps | 340/693 |
| 4,724,430 | 2/1988 | Igarashi | 340/693 |
| 4,812,827 | 3/1989 | Scripps | 340/693 |

FOREIGN PATENT DOCUMENTS

| | | | |
|---|---|---|---|
| 3013599 | 12/1980 | Fed. Rep. of Germany | 340/693 |
| 53-17096 | 2/1978 | Japan | 340/584 |
| 53-17097 | 2/1978 | Japan | 340/584 |
| 53-17100 | 2/1978 | Japan | 340/693 |
| 454029 | 2/1975 | U.S.S.R. | 340/584 |
| 750036 | 6/1956 | United Kingdom . | |
| 811141 | 4/1959 | United Kingdom . | |
| 968111 | 8/1964 | United Kingdom . | |
| 1507268 | 4/1978 | United Kingdom . | |
| 2011141 | 7/1979 | United Kingdom . | |
| 2047013 | 11/1980 | United Kingdom | 340/693 |
| 1589869 | 5/1981 | United Kingdom . | |

*Primary Examiner*—William A. Cuchlinski, Jr.
*Assistant Examiner*—Diego F. F. Gutierrez

[57] ABSTRACT

A fire detector for detecting a fire occurrence, including a temperature sensor comprising a thermistor or, a platinum wire, a protective cover enclosing the temperature sensor and protecting the temperature sensor from external impacts, and a protector projecting from the front face of the sensor body and surrounding the temperature sensor.

6 Claims, 2 Drawing Sheets

FIRE DETECTOR HAVING A PROTECTIVE COVER

BACKGROUND OF THE INVENTION

This invention relates to a fire detector for use in a fire alarm system in which a temperature increase due to a fire is sensed by a temperature sensor such as a thermistor or a platinum wire.

There have conventionally been manufactured fire detectors of the type in which a temperature sensor, such as a thermistor or a platinum wire, senses a temperature increase due to a fire to detect the occurrence of the fire. In such fire sensors, the portion of the temperature sensor which is exposed to the ambient atmosphere is enclosed in a metal tube or a resin tube in order to protect the temperature sensor from an exterior shock.

When a temperature sensor is enclosed in a metal tube or a resin tube as described above, the thermal capacity becomes greater, and its response ability is lowered. Therefore, to enhance its response ability, the temperature sensor has to be exposed to the ambient atmosphere. However, in this case the temperature sensor can not be protected against impacts, etc., applied thereto from the exterior. Also, there is no means for achieving shielding from external electrical noises developing when the temperature sensor is enclosed in a metal tube.

SUMMARY OF THE INVENTION

An object of this invention is to provide a fire detector which is protected against external impacts and has a high response ability to a fire occurrence.

Another object of this invention is to provide a fire detector having a means for shielding external electrical noises.

The above objectives and other objectives are attained by the provision of the fire detector of this invention, comprising: a temperature sensor for sensing a temperature increase due to a fire and a protective cover enclosing the temperature sensor and protecting the temperature sensor from external impacts.

DETAILED DESCRIPTION OF THE INVENTION

A preferred embodiment of the invention will now be described with reference to the accompanying drawings.

Figure 1:
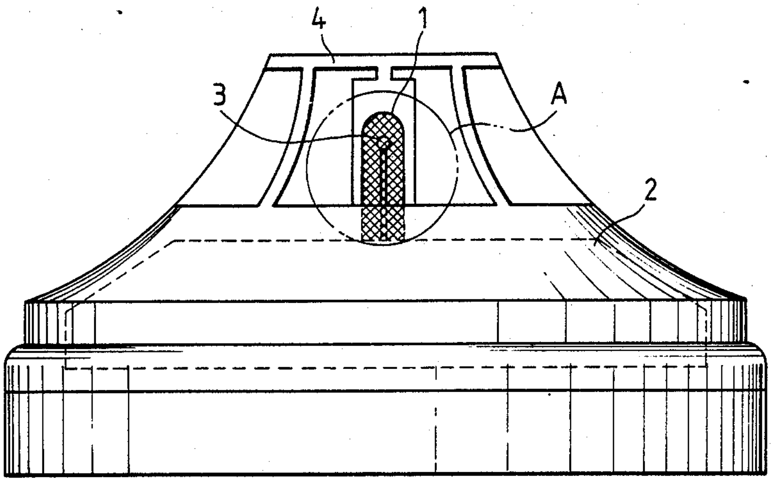
FIG. 1 is a side view of one embodiment of a fire detector of this invention.

FIG. 1 is a side view of one embodiment of a fire detector of the present invention. At a central portion of a front face of a body 2, a temperature sensor 3, such as a thermistor, a platinum wire or the like, is enclosed by a protective cover 1 comprising an electrically-conductive net such as a metal net. In order to enhance the protection against impacts from the exterior, there is also provided a protector 4 projecting from the front face of the body 2 in such a manner that the protector 4 surrounds the temperature sensor 3. The body 2 contains therein electrical circuits 6 for converting into a sensing signal a temperature signal which has been obtained by the temperature sensor 3. Ordinarily, these electrical circuits 6 are contained in a shield case 5 so that various effects of external electrical noises are eliminated.

Figure 2:
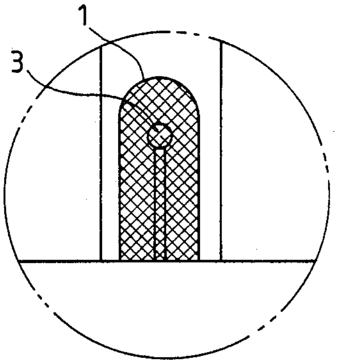
FIG. 2 is an enlarged view of an important portion A of the fire detector as shown in FIG. 1.
Figure 1A:
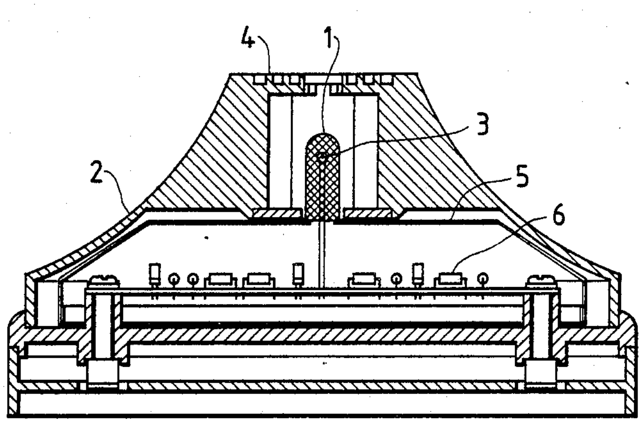
FIG. 1A is a section view of the detector of FIG. 1 showing the interior of the shield case.

FIG. 2 is an enlarged view of the portion A of FIG. 1, which is a most important portion of the fire detector of this invention.

In FIG. 2, the protective cover 1 is of a cap-like shape and encloses the temperature sensor 3 in such a manner that it is not in direct contact with the temperature sensor 3 and is electrically connected to the shield case disposed within the body 2.

In the embodiment as described above, although the electrically-conductive net comprises a metal net, an electrically-conductive resin, a perforated metal sheet, or the like may be used.

Further, the protective cover may be coated on the surface thereof with an insulating material such paint or the like so that a user is protected from an electric shock when he contacts the protective cover.

Still further, although the protector 4 is provided on the front face of the body 2 for reinforcing purposes, it may be omitted if the protective cover 1 is sufficiently strong.

As described above, in the fire detector according to the present invention, since the portion of the temperature sensor which is exposed to the ambient atmosphere is enclosed by the protective cover comprising an electrically-conductive net, the temperature sensor can be protected against external impacts, etc. Further, since the temperature sensor is exposed directly to the ambient atmosphere through the meshes of the protective cover, its response ability is not lowered. Still further, the protective cover itself achieves a shielding effect, so that the temperature sensor will not be subjected to malfunction due to external electrical noises.

What is claimed is:

1. A fire detector for detecting a fire occurrence, comprising:

a temperature sensor for sensing a temperature increase due to a fire, and a protective cover for enclosing said temperature sensor and protecting said temperature sensor from external impacts said fire detector further comprising electrical circuits for converting into a sensing signal a temperature signal from said temperature sensor, and a shield case containing said electric circuits therein, thereby to eliminate the effects of external electrical noises and said shield case being electrically connected to said protective cover.

2. A fire detector as claimed in claim 1, wherein said protective cover comprises any one of an electrically-conductive metal net, an electrically-conductive resin and a perforated metal sheet.

3. A fire detector as claimed in claim 1, wherein said temperature sensor comprises any one of a thermistor or a platinum wire.

4. A fire detector as claimed in claim 1, wherein said fire detector further comprising a protector projecting from the front face thereof and surrounding said temperature sensor.

5. A fire detector as claimed in claim 1, wherein said protective cover is coated with an insulating material.

6. A fire detector as claimed in claim 5, wherein said insulating material comprises paint.

* * * * *